(12) United States Patent
Perdue et al.

(10) Patent No.: US 10,577,183 B2
(45) Date of Patent: Mar. 3, 2020

(54) EDGE DRIVE MESH OVERLAY CONVEYOR BELT

(71) Applicant: CAMBRIDGE INTERNATIONAL, INC., Cambridge, MD (US)

(72) Inventors: Thomas O. Perdue, Salisbury, MD (US); Crystal A. Willey, Vienna, MD (US)

(73) Assignee: Cambridge International, Inc., Cambridge, MD (US)

( * ) Notice: Subject to any disclaimer, the term of this patent is extended or adjusted under 35 U.S.C. 154(b) by 0 days.

(21) Appl. No.: 15/702,200

(22) Filed: Sep. 12, 2017

(65) Prior Publication Data
US 2018/0072504 A1    Mar. 15, 2018

Related U.S. Application Data

(60) Provisional application No. 62/394,451, filed on Sep. 14, 2016.

(51) Int. Cl.
| | |
|---|---|
| *B65G 17/42* | (2006.01) |
| *B65G 17/46* | (2006.01) |
| *B65G 17/06* | (2006.01) |
| *B65G 23/06* | (2006.01) |

(52) U.S. Cl.
CPC .......... *B65G 17/42* (2013.01); *B65G 17/064* (2013.01); *B65G 17/46* (2013.01); *B65G 23/06* (2013.01)

(58) Field of Classification Search
CPC ...... B65G 15/54; B65G 17/064; B65G 21/18; B65G 2207/24
USPC ........................................ 198/848, 778, 831
See application file for complete search history.

(56) References Cited

U.S. PATENT DOCUMENTS

| | | | |
|---|---|---|---|
| 3,920,117 A | 11/1975 | Roinestad | |
| 4,450,953 A * | 5/1984 | Le Cann | B65G 21/18 198/778 |
| 7,762,388 B2 * | 7/2010 | Lago | B65G 17/063 198/778 |
| 8,302,765 B2 * | 11/2012 | Lago | B65G 17/064 198/778 |
| 8,985,318 B2 * | 3/2015 | Neely | B65G 17/063 198/853 |
| 9,061,829 B2 | 6/2015 | Salsone et al. | |
| 9,371,190 B2 * | 6/2016 | Rettore | B65G 17/064 |
| 9,440,793 B2 * | 9/2016 | Matsuzaki | B65G 17/063 |

(Continued)

FOREIGN PATENT DOCUMENTS

| | | |
|---|---|---|
| DE | 20 2006 004 102 U1 | 5/2006 |
| EP | 0 850 858 A1 | 7/1998 |

(Continued)

OTHER PUBLICATIONS

The extended European Search Report dated May 8, 2018, by the European Patent Office in corresponding European Patent Application No. 17190882.5-1017. (8 pages).

*Primary Examiner* — William R Harp
(74) *Attorney, Agent, or Firm* — Quarles & Brady LLP

(57) ABSTRACT

A conveyor belt having a plurality of spaced tractive rods, a plurality of rows transversely disposed with respect to a direction of travel and interconnecting the plurality of spaced tractive rods, a plurality of belt drive clips, and a plurality of belt hold-down clips, wherein each of the rows comprises a U-shaped link on each edge and a mesh overlay extending therebetween.

8 Claims, 13 Drawing Sheets

(56) References Cited

U.S. PATENT DOCUMENTS 9,540,176 B2 * 1/2017 Matsuzaki ........... B65G 17/063
2010/0282577 A1 * 11/2010 Rettore ................ B65G 17/064
198/851

FOREIGN PATENT DOCUMENTS

| EP | 2 248 741 A1 | 11/2010 |
|----|--------------|---------|
| NL | 1018669 C2 | 2/2003 |
| WO | 2007/076532 A2 | 7/2007 |
| WO | 2014/040827 A1 | 3/2014 |
| WO | 2015/079412 A1 | 6/2015 |

* cited by examiner

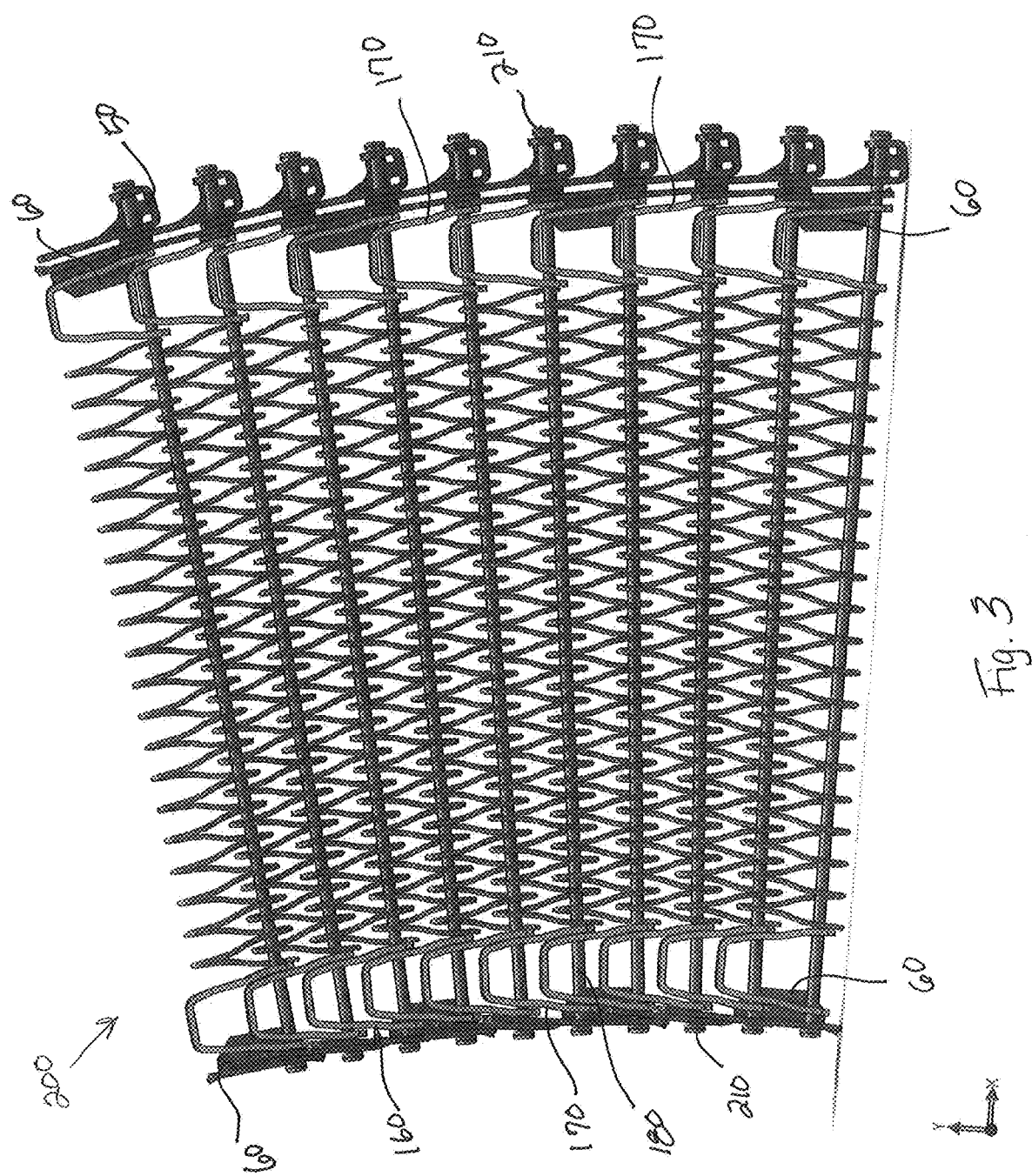

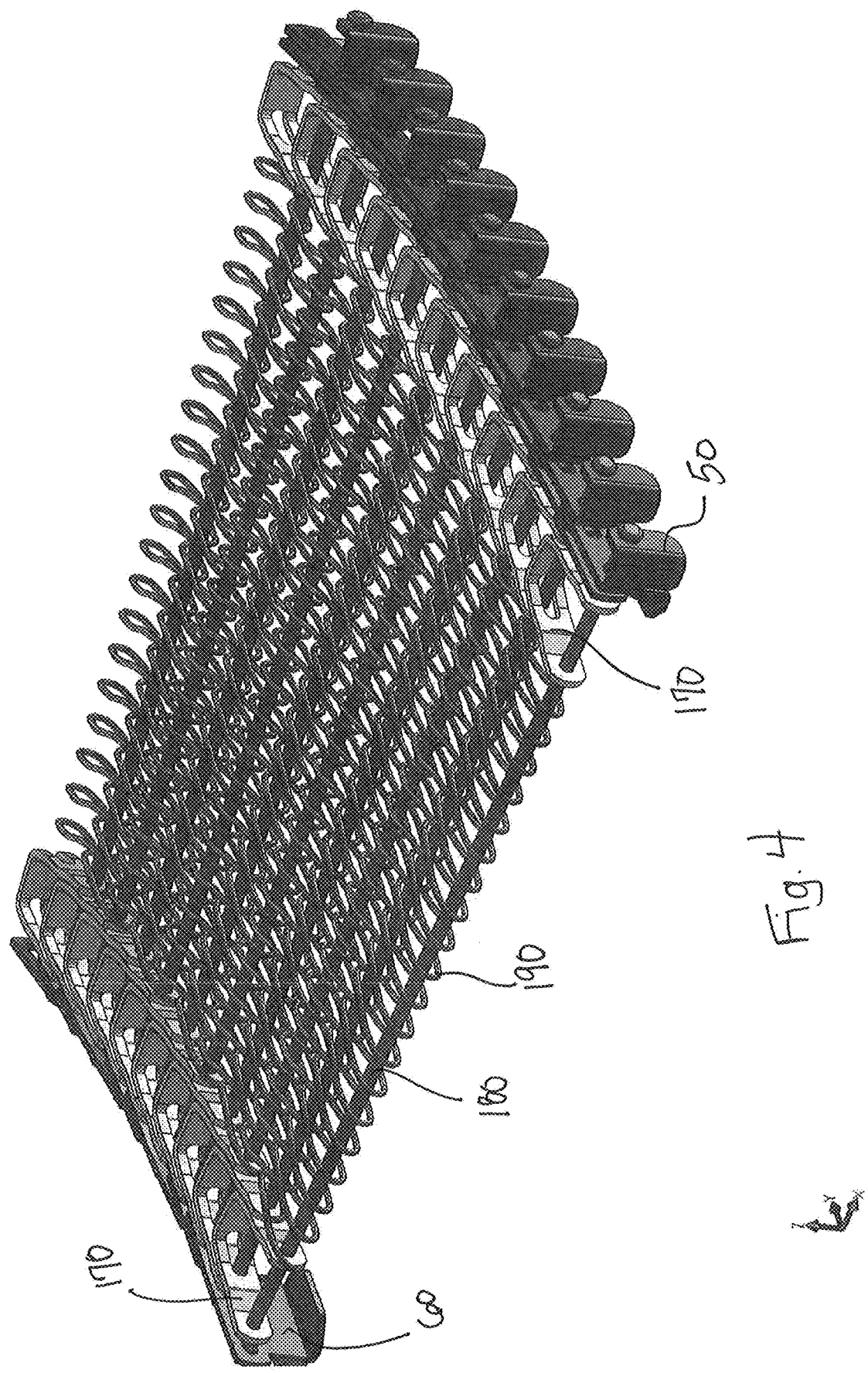

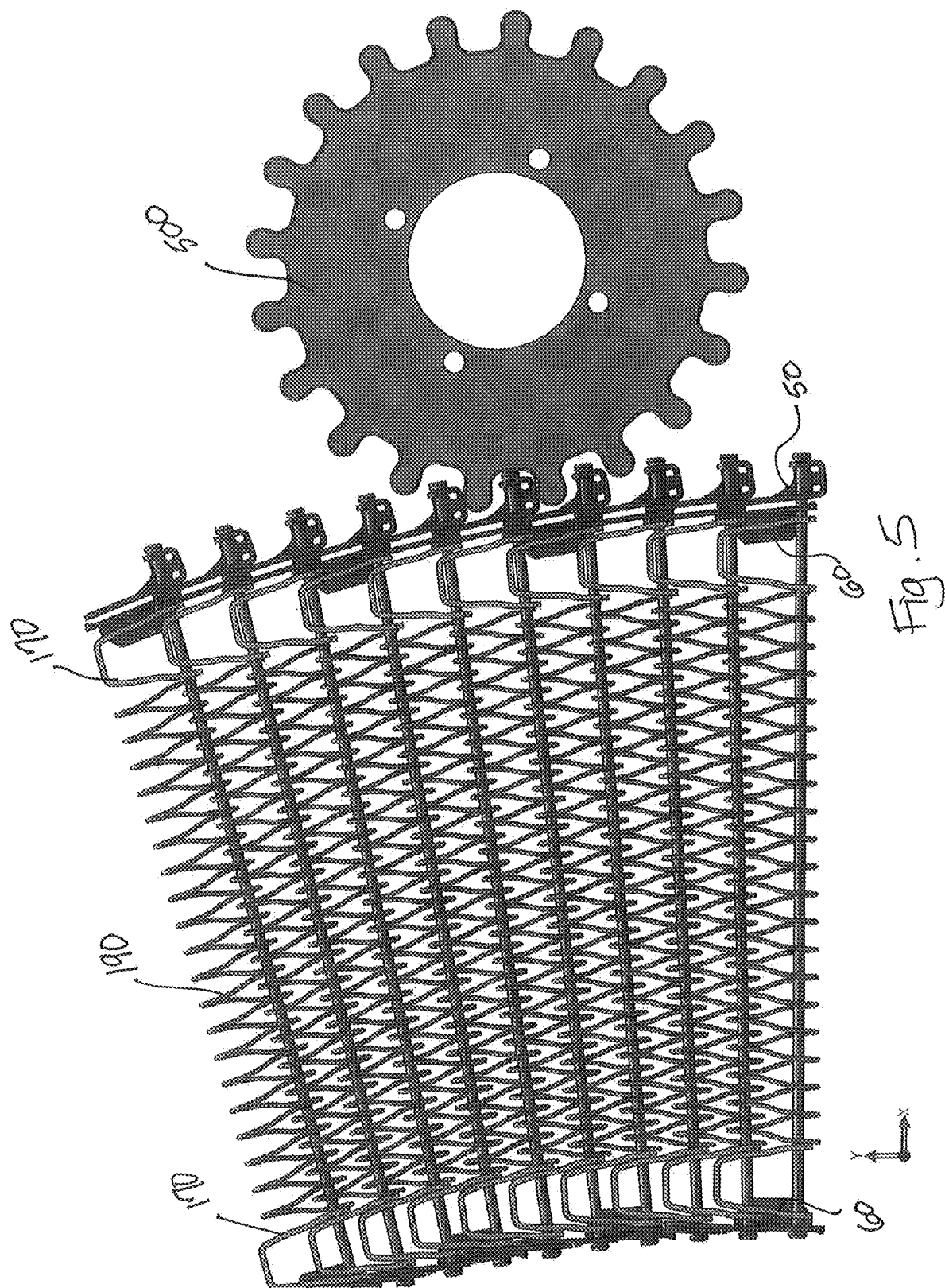

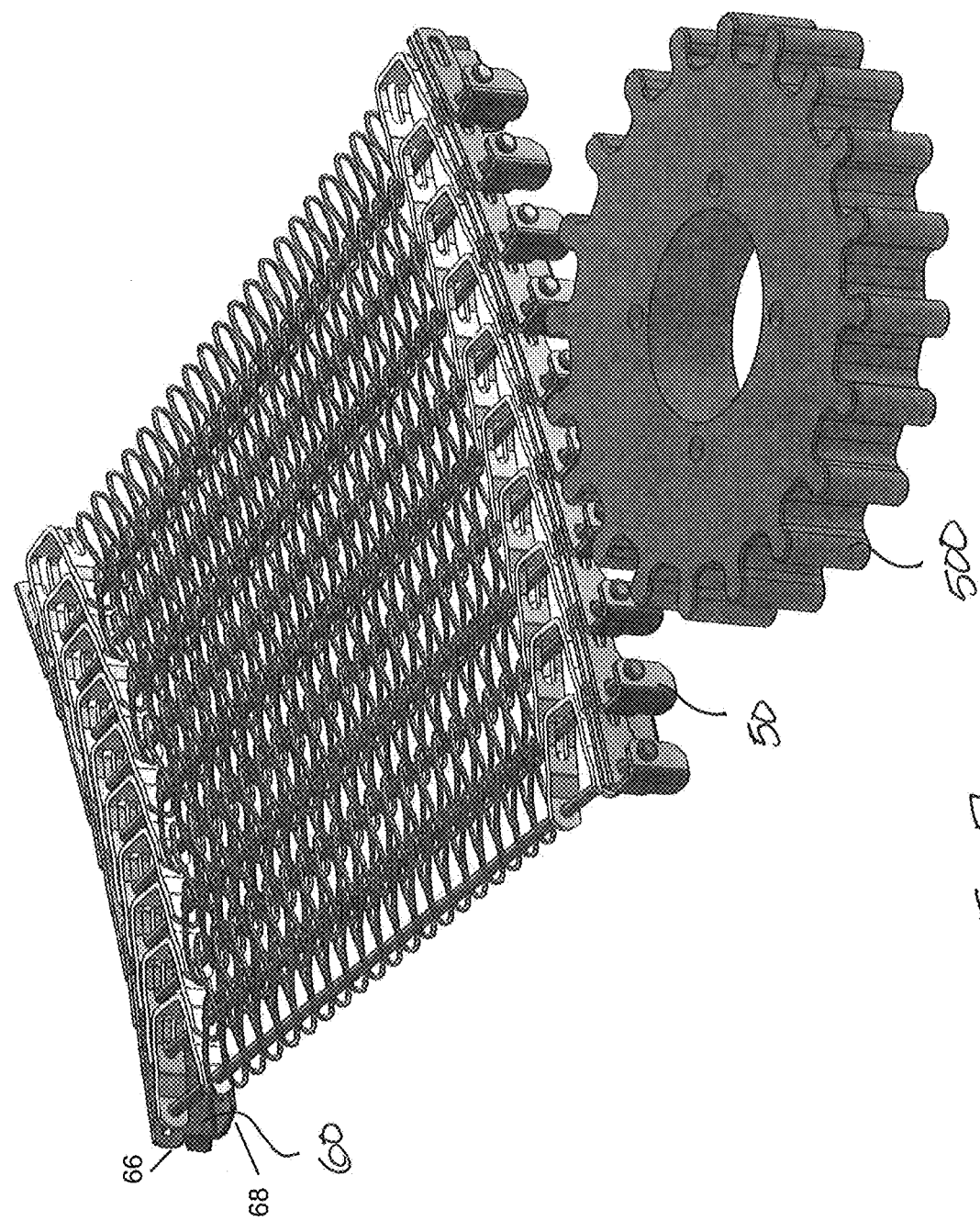

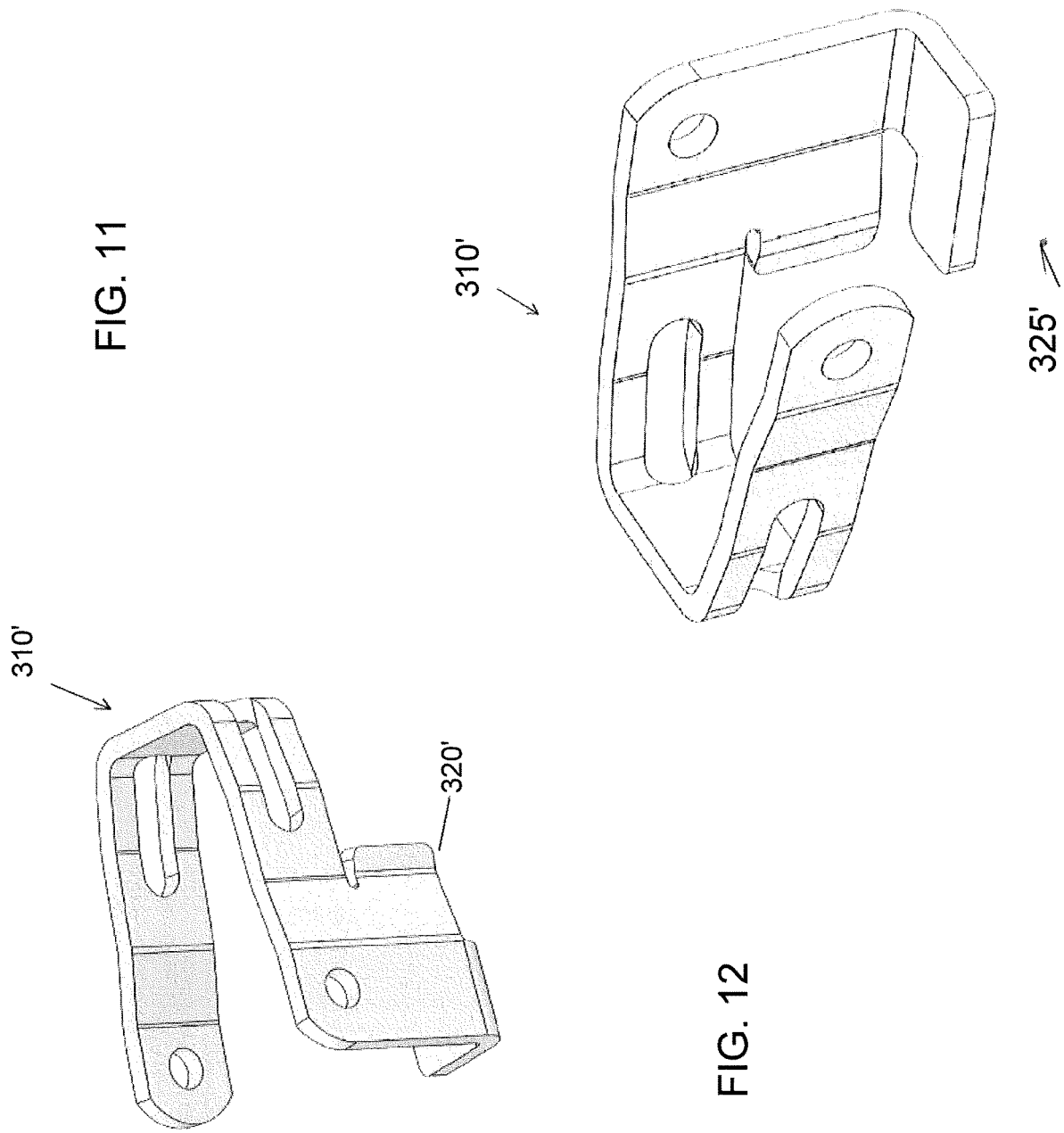

EDGE DRIVE MESH OVERLAY CONVEYOR BELT

TECHNICAL FIELD

The present disclosure is directed to a conveyor belt, and more particularly to an edge drive mesh overlay conveyor belt for maintaining belt orientation and providing improved positive edge drive capability.

BACKGROUND OF THE DISCLOSURE

As shown in FIG. 1, a spiral overlay or mesh overlay conveyor belt 10 is comprised of wire spirals 12 intermeshed together by connecting rods 14 extending across the conveyor belt in the transverse direction. The ends of the rods extend through links 16 which pivotally connect adjacent rods, and are arranged along the side edges of the conveyor. The links also serve as tractive links in that they engage the sprockets which drive the conveyor.

Fatigue failure on the positively driven edge of the mesh overlay belt has been a concern in the past, as well as maintaining the belt in the proper position on the spiral conveyor.

Accordingly, there exists a need in the marketplace for a conveyor belt having an edge configuration for maintaining belt orientation, providing improved positive edge drive capability, and reducing fatigue failures on the driven edges of the conveyor belt.

SUMMARY

A conveyor belt comprising a plurality of spaced tractive rods; a plurality of rows transversely disposed with respect to a direction of travel and interconnecting said plurality of spaced tractive rods; a plurality of belt drive clips; and wherein each of said rows comprises a U-shaped link on each edge and a mesh overlay extending therebetween. According to a further aspect of the disclosure, at least some of the U-shaped links include an integral hold-down clip; wherein said conveyor belt includes opposing first and second outer edges and said plurality of belt drive clips and/or U-shaped links with the integral hold-down clip are disposed on at least one of the first and second outer edges of the conveyor belt.

A conveyor belt with improved edge drive capability, said conveyor belt comprising a plurality of spaced tractive rods; a plurality of pitch rows transversely disposed with respect to a direction of travel and interconnecting said plurality of spaced tractive rods; and a plurality of belt drive clips; wherein each of said rows comprises a U-shaped link on each edge and a mesh overlay extending therebetween; wherein at least some of the U-shaped links include an edge guard; and wherein said conveyor belt includes opposing first and second outer edges and said plurality of belt drive clips and/or U-shaped links with the integral hold-down clip are disposed on at least one of the first and second outer edges of the conveyor belt.

BRIEF DESCRIPTION OF THE DRAWING FIGURES

These and other objects, features, and advantages of the invention will become more readily apparent to those skilled in the art upon reading the following detailed description, in conjunction with the appended drawings in which:

FIG. 3 is a top elevational view of a conveyor belt according to a further exemplary embodiment of the disclosure.

FIG. 4 is a perspective view thereof.

FIG. 5 is a top elevational view thereof in engagement with a sprocket.

FIG. 6 is a perspective view thereof in engagement with a sprocket.

FIG. 7 is a further perspective view thereof in engagement with a sprocket.

FIG. 11 is perspective view of a link in the conveyor belt of FIG. 10.

FIG. 12 is a further perspective view of a link in the conveyor belt of FIG. 10.

DETAILED DESCRIPTION

Figure 1:
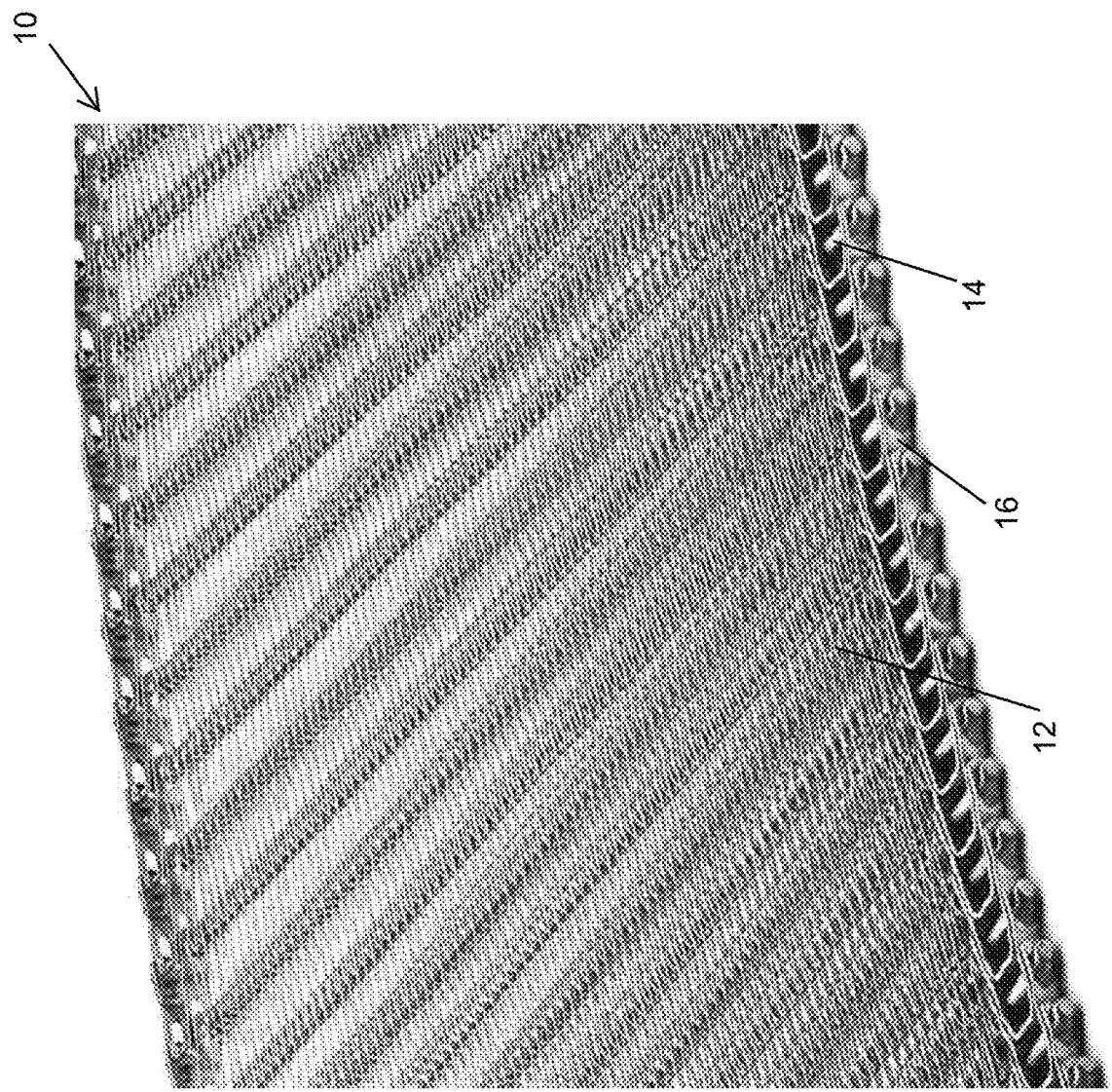
FIG. 1 is a top elevational, partly schematic view with portions broken away, of a segment of a conventional spiral mesh overlay conveyor belt.

An edge drive mesh overlay conveyor belt will be described below by reference to the embodiments disclosed here as examples and in accordance with the attached drawings. In the following descriptions of the various embodiments disclosed herein, it is understood that like reference numerals are used to describe the same elements throughout.

A conveyor belt 100, 200 constructed using a plurality of belt drive clips 50 and a plurality of hold-down clips 60, is shown in FIGS. 2-8. The belt drive clips 50 are preferably formed in a J-shape on every pitch, or support row, and a hold-down clip 60 is preferably positioned every third pitch, or support row, in an overlapping pattern. Other patterns such as every pitch, every other pitch, etc., could also be used. A standard reinforcing bar 140, or a plurality of bars, may also be inserted into the belt 100 on those pitches, or support row, where no hold-down clip 60 is used.

The belt drive clip 50 and the hold-down clip 60 are fully disclosed in U.S. Pat. No. 9,061,829 to the present assignee and which is hereby incorporated by reference.

Figure 2:
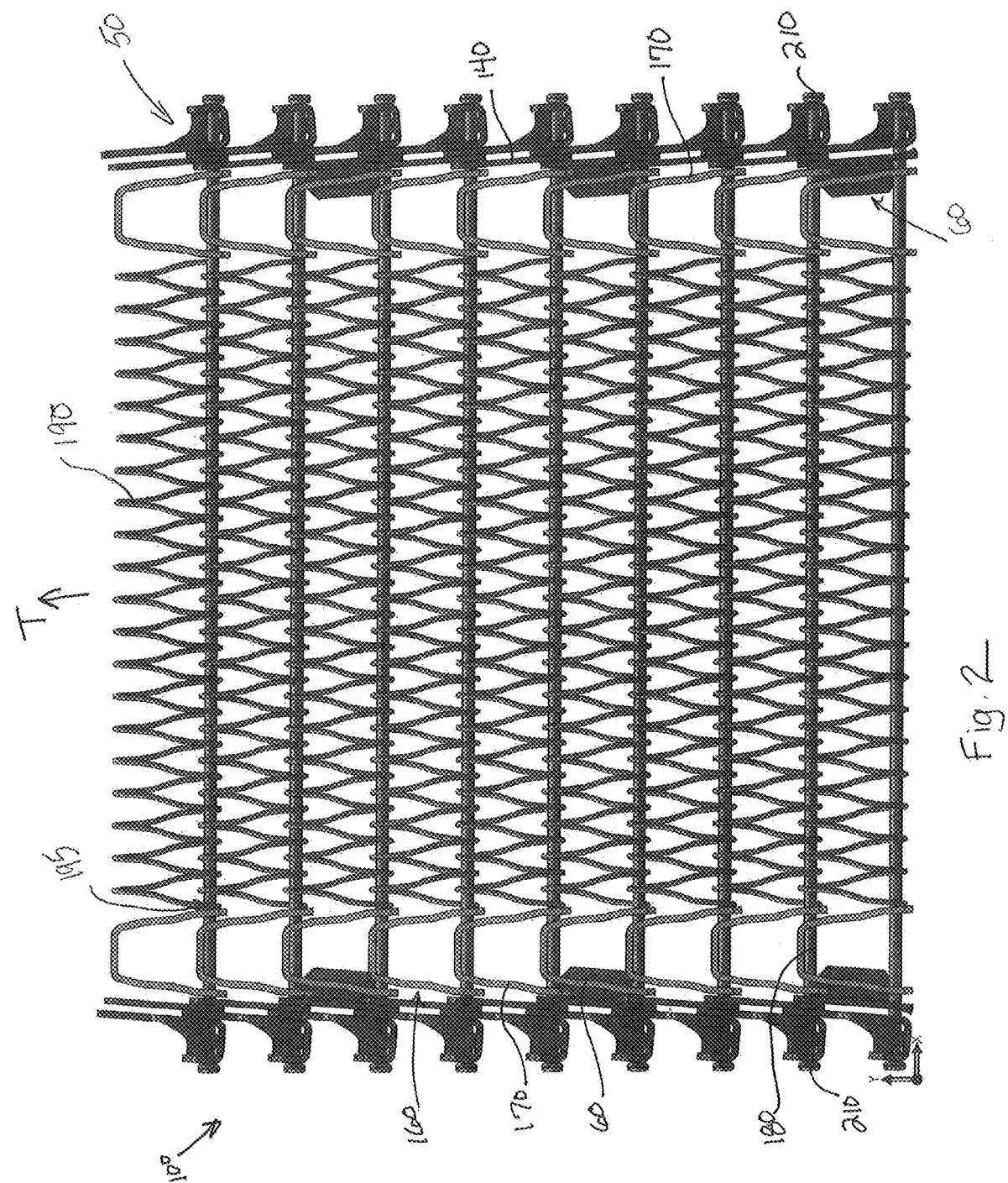
FIG. 2 is a top elevational view of a conveyor belt according to an exemplary embodiment of the disclosure.

A conveyor belt in accordance with a first embodiment of the disclosure here is shown generally in FIG. 2 by reference numeral 100. Conveyor belt 100 preferably comprises a mesh overlay conveyor belt, although other belt types and configurations could of course be used. Conveyor belt 100 includes a plurality of spaced tractive rods 180 disposed in succession and transversely with respect to a direction of travel T as represented by arrow T of belt 100, each rod 180 having two ends, each preferably terminating in a button-head 210.

Belt 100 includes a plurality of support rows 160 transversely disposed with respect to the direction of travel T, and interconnecting the succession of rods 180. Each row 160 is comprised of a plurality of U-shaped links 170, each link connecting a rod 180 with a following rod in the succession. More preferably, each row 160 includes at least one link 170 on each end and a mesh overlay 190 extending therebetween. In addition, belt 100 preferably includes one or more rows including a J-shaped belt drive clip 50, a hold-down clip 60 and a reinforcing bar 140 disposed along at least one edge of the conveyor belt. Belt drive clips 50, hold-down clips 60 and reinforcing bars 140 can be positioned along both edges of the conveyor belt (as shown in FIG. 2) depending on the desired construction and function of the particular belt. Still further, while the combined use of belt drive clips 50 and hold-down clips 60 is preferable, it is within the scope of the present disclosure that either one could be used by itself in connection with the conveyor belt. That is, the conveyor belt 100 may include only belt drive clips 50 and reinforcing bars 140 or, alternatively, only hold-down clips 60 and reinforcing bars 140. As shown in FIG. 3, belt 200 includes hold-down clips 60 along one edge (interior edge) and belt drive clips 50 and hold-down clips 60 along the other edge (exterior edge). Still further, belt 100, 200 may be manufactured without any reinforcing bars or alternatively, several rows of reinforcing bars may be provided, depending upon the particular application. Thus, it should be apparent to one skilled in the art, that in accordance with the disclosure herein any combination of belt drive clips, hold-down clips and/or reinforcing bars may be used depending upon the particular application for which the conveyor belt is intended.

The combination of overlapping J-shaped drive clips and hold-down clips on the outer edge(s) of the conveyor belt with a welded U-shaped link and rod assembly provide support for the position of the metal mesh overlay. The rows of clips and bars along the outer, tension-bearing belt edge provide superior strength to offset the belt tension that results during system operation. The welded assembly of inner and outer U-shaped links and rods provides a structure that eliminates the possibility for excess lateral movement of the rows of bars and links from the inside or outside belt edges while at the same time provides surfaces where the belt can contact the stationary support rails (described further below). It is preferred for the U-shaped links to contact the support rails rather than the mesh overlay in order to reduce the contact pressure between the belt and rail, reducing also the likelihood of component wear.

Figure 8:
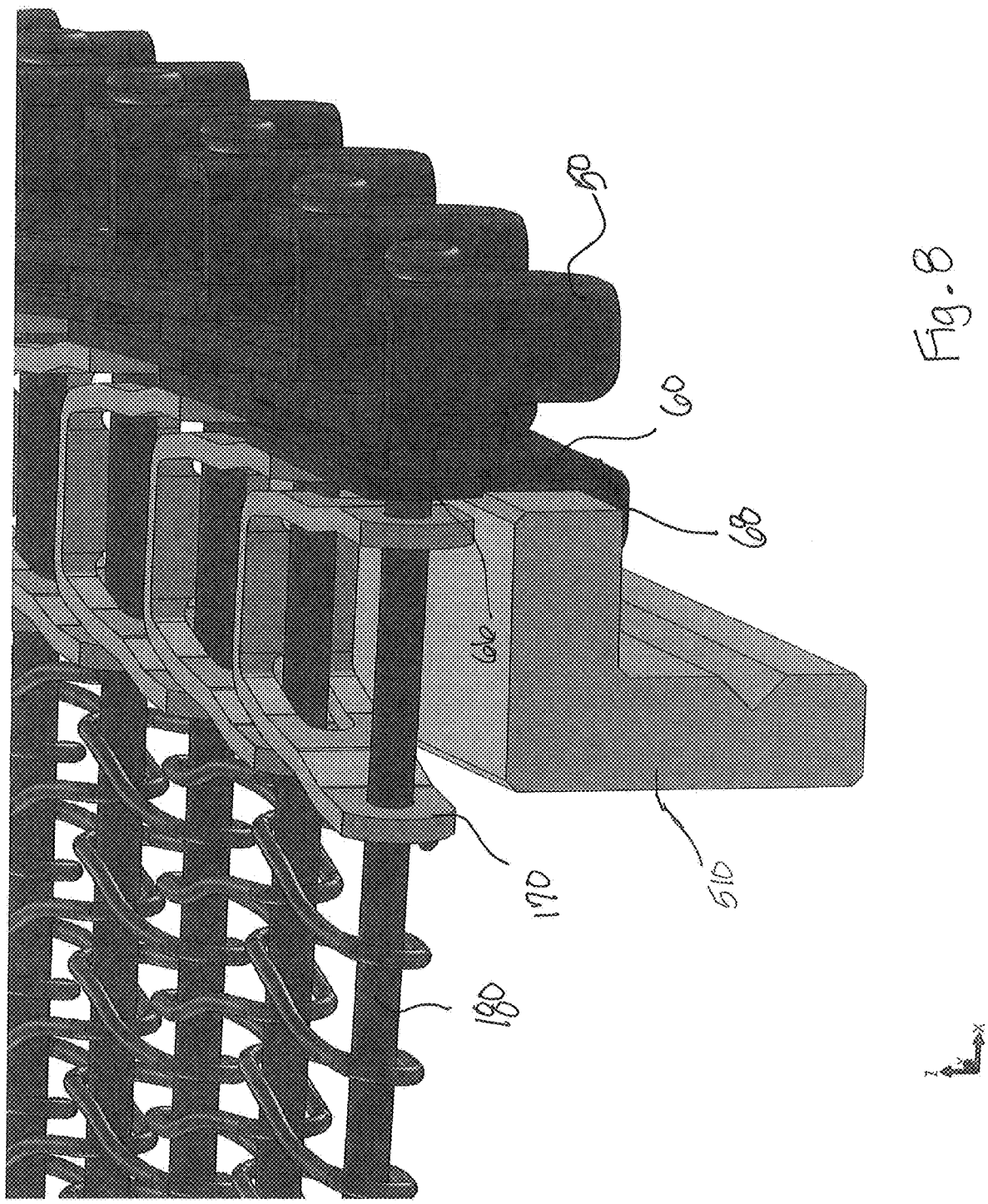
FIG. 8 is a perspective view thereof in engagement with a support rail.
Figure 9:
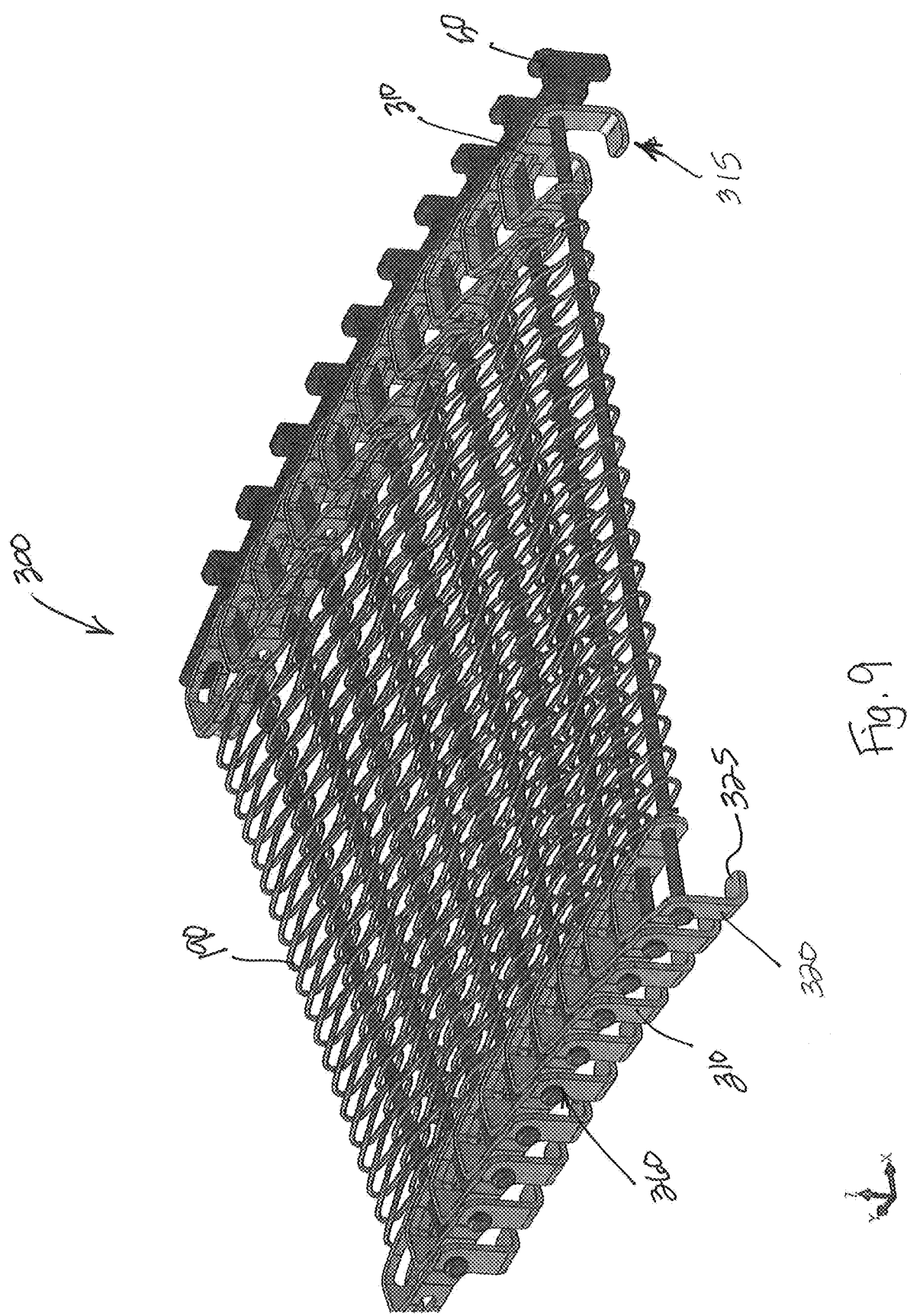

As illustrated in FIGS. 5-8, the belt is driven forward by the engagement with sprockets positioned along the outer periphery of the belt's spiral path. If needed, the belt can also be driven from the top side or underneath using different sprockets to engage the U-shaped links along the belt edges. The J-shaped drive clips 50 are engaged by sprocket 500 driven by a vertically-oriented shaft of a spindle drive (not shown), while the hold-down clips 60 serve to maintain the belt 100, 200 in proper orientation both laterally and vertically relative to the sprocket 500. A vertical extension portion of the hold-down clip 60 supports the reaction loading on the belt 100 as a result of engagement with a support rail 510 (FIG. 8). The extending member 68 of the hold-down clip 60 as it extends below the thickness of the belt 100 is typically positioned against a stationary support rail 510 and prevents the belt 100 from inadvertently lifting off of the support rail 510. The opposing wings 66 on each side of the hold-down clip 60 are provided to ensure a smooth engagement with the rail 510 regardless of the driven direction of the belt 100. Both the belt drive clip 50 and the hold-down clip 60 are positioned in an overlapping pattern along with additional reinforcing bars 140 to act as load carrying members, especially during those times when the belt 100 is partially collapsed, as in a turn for example.

Figure 9:
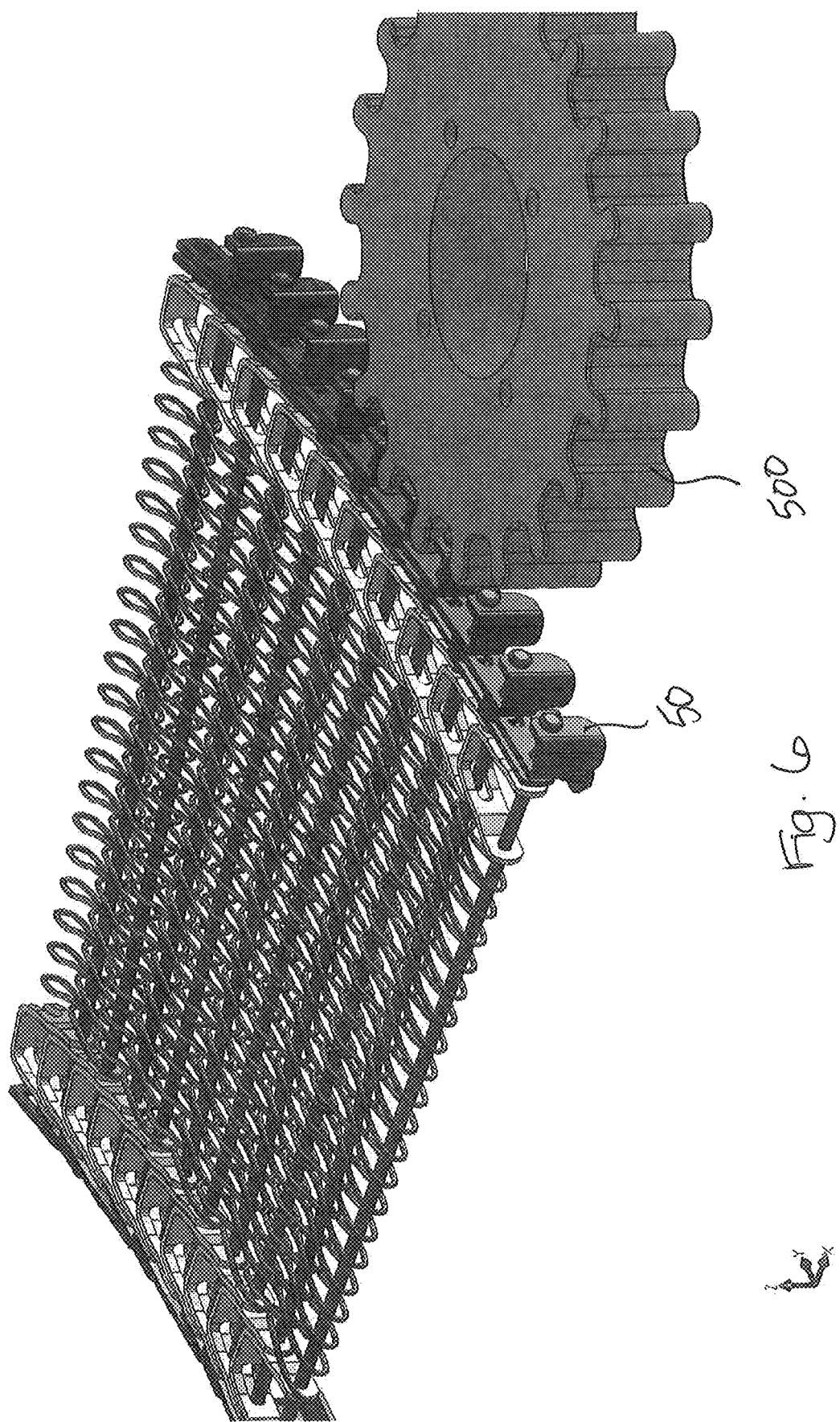
FIG. 9 is a perspective view of a conveyor belt according to a further exemplary embodiment of the disclosure.

A conveyor belt in accordance with a further exemplary embodiment is shown generally in FIG. 9 by reference numeral 300. Conveyor belt 300 preferably comprises a mesh overlay conveyor belt as described above, although other belt types and configurations could of course be used. Conveyor belt 300 includes a plurality of spaced tractive rods 180 disposed in succession and transversely with respect to a direction of travel of belt 300, each rod 180 having two ends preferably terminating in a buttonhead 210.

Belt 300 includes a plurality of support rows 360 transversely disposed with respect to the direction of travel T, and interconnecting the succession of rods 180. Belt 300 preferably includes at least one row of J-shaped belt drive clips 50 disposed along at least one edge of the conveyor belt. Each row 360 is comprised of a plurality of links 310, each link connecting a rod 180 with a following rod in the succession. More preferably, each pitch or row 360 includes at least one link 310 on each end and a mesh overlay 190 preferably extending therebetween. Link 310 includes an integral hold-down clip 315 comprising a depending extension 320 and an extending tab member 325. The depending extension 320 supports the reaction loading on the belt 300 as a result of engagement with the support rail 510. The upstanding extending tab member 325 of the integral hold-down clip 315 extends below the thickness of the belt 300 and would positioned against a stationary support rail 510 (as shown in FIG. 8) and prevents the belt 100 from inadvertently lifting off of the support rail 510.

Figure 10:
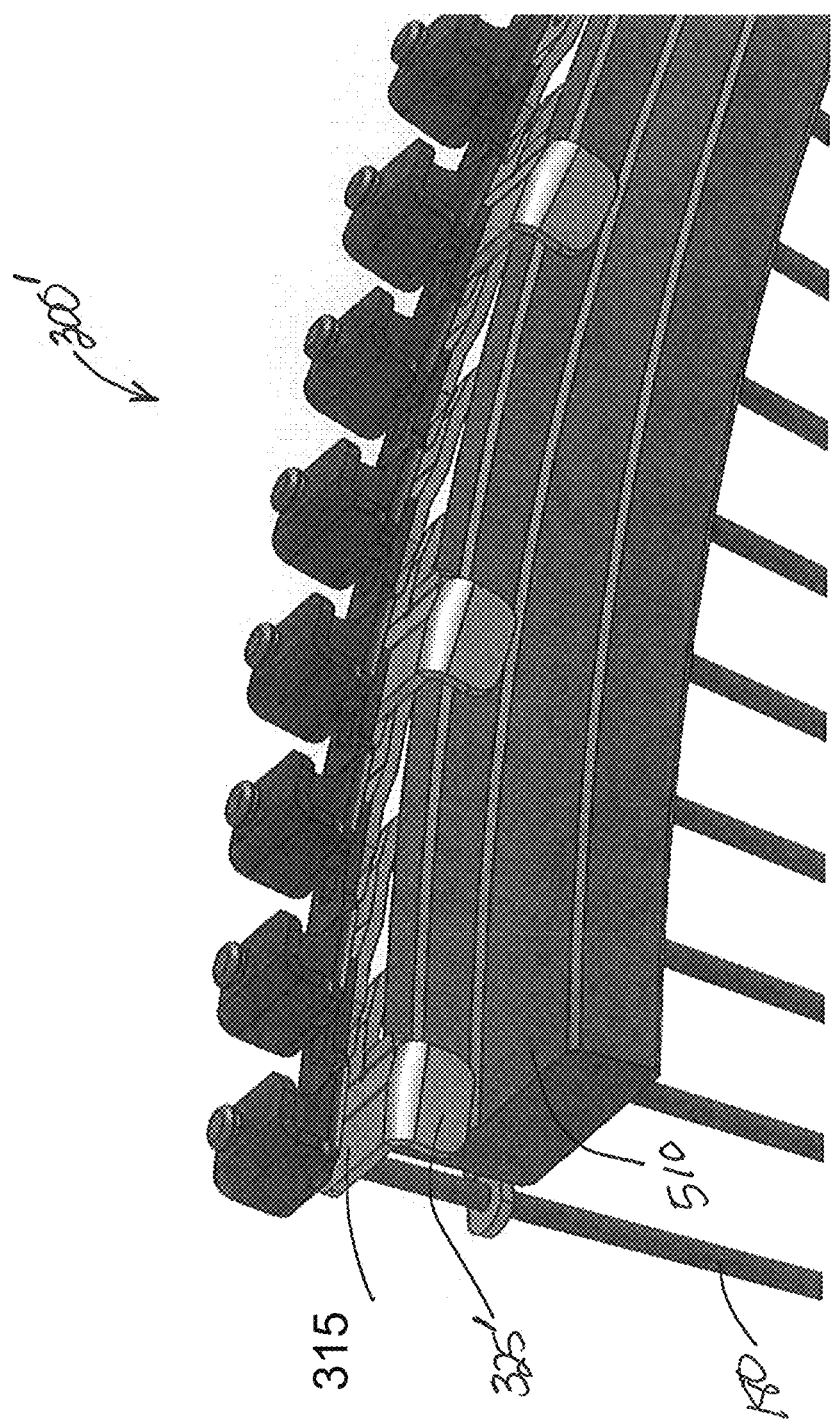
FIG. 10 is perspective view of a conveyor belt according to a further exemplary embodiment of the disclosure.
Figure 13:
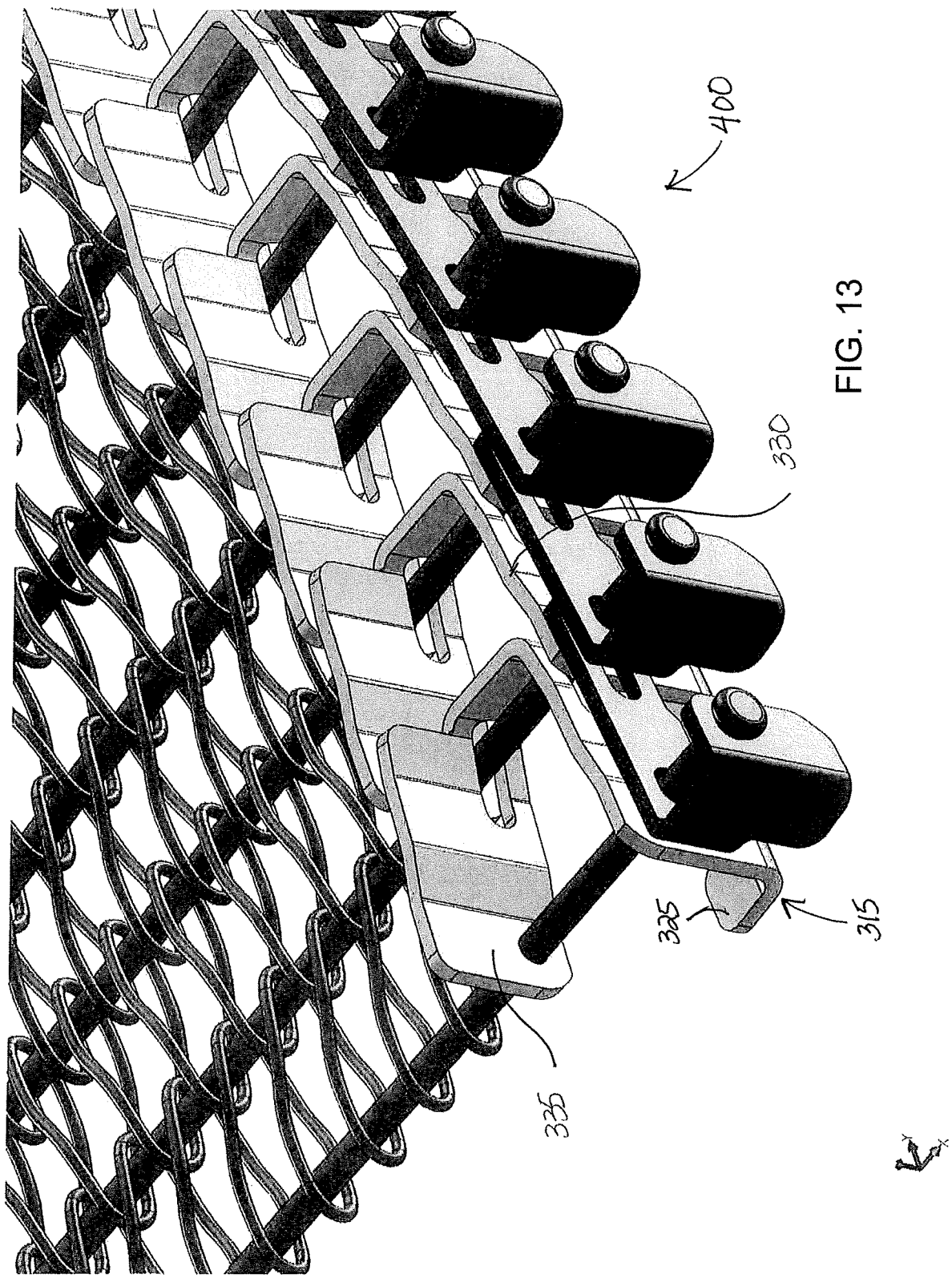
FIG. 13 is perspective view of a conveyor belt according to a further exemplary embodiment of the disclosure.
Figure 14:
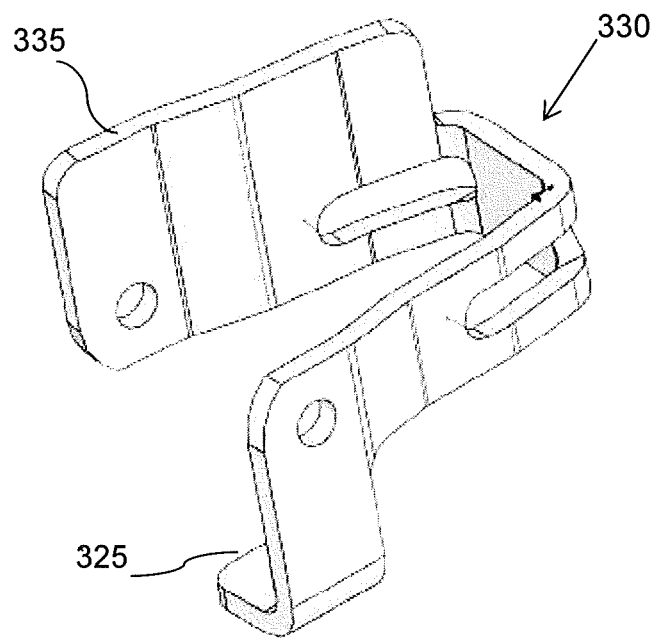
FIG. 14 is perspective view of a link in the conveyor belt of FIG. 13.
Figure 15:
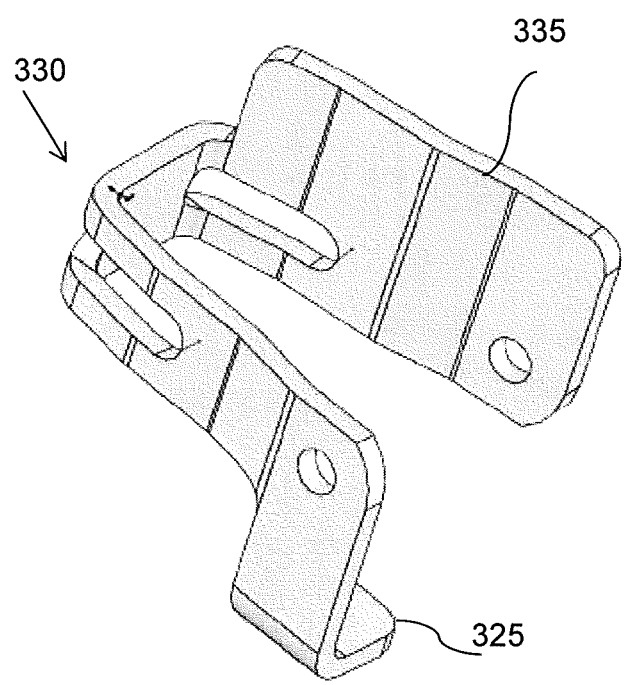
FIG. 15 is perspective view of a link which is the mirror image of the link shown in FIG. 14.

In a further exemplary embodiment shown in FIGS. 10-12, at least one row 360 includes at least one link 310' on each end and a mesh overlay 190 preferably extending therebetween. Link 310' includes an integral hold-down clip 315' comprising a depending extension 320' and an extending tab member 325'. As shown in FIG. 10, links 310' including the integral hold-down clips 315' are provided on every third pitch rather than every pitch as shown in FIG. 9. As a result of this spacing, the extending tab member 325' can be wider so as to increase contact with the rail 510. That is, by mixing links that have integral hold-down clips with links that do not have integral hold-down clips in some pre-determined pattern, it is possible to increase the width of the tab member and subsequently the strength of the tab member without interfering with the collapse of the belt or the articulation of the belt links around a roller. As should be apparent to one skilled in the art, link 310' including an integral hold-down clip 315' will be either a left-hand link or a right-hand link depending on which edge of the belt it is to be disposed, one being the mirror image of the other Referring also to FIGS. 13-15, a further exemplary embodiment according to the disclosure herein includes belt 400 which combines the integral hold-down clip 315 with a U-shaped link 330 which also has a vertical extension above the top surface of the belt that serves as an edge guard 335 to retain product on the belt. An additional modification of belt 400 could include links with edge guards on every other pitch or every third pitch, etc. instead of every pitch as shown. A similar component spacing modification could apply to using links with integral hold-downs. As illustrated, the link 330 in FIG. 14 is considered a right-hand link and the link 330 shown in FIG. 15 is considered a left-hand link which is a mirror image of that shown in FIG. 14 and the correct link will be selected depending on which edge of the belt it is to be disposed.

While the combined use of the various embodiments of the belt drive clips, hold-down clips or integral hold-down clips is preferable, it is within the scope of the disclosure that either one could be used by itself in connection with the conveyor belt. That is, the conveyor belt may include only belt drive clips and reinforcing bars or, alternatively, only hold-down clips and reinforcing bars. Still further, the belt may be manufactured without any reinforcing bars or alternatively, several rows of reinforcing bars may be provided, depending upon the particular application. Thus, it should be apparent to one skilled in the art, that any combination of belt drive clips, hold-down clips and/or reinforcing bars may be used depending upon the particular application for which the conveyor belt is intended.

While the present invention has been described with respect to a particular embodiment of the present invention, this is by way of illustration for purposes of disclosure rather than to confine the invention to any specific arrangement as there are various alterations, changes, deviations, eliminations, substitutions, omissions and departures which may be made in the particular embodiment shown and described without departing from the scope of the claims.

What is claimed is:

1. A conveyor belt configured to be driven on a spiral conveyor having support rails, the conveyor belt comprising:
    a plurality of spaced tractive rods;
    a plurality of support rows transversely disposed with respect to a direction of travel and interconnecting said plurality of spaced tractive rods;
    a plurality of belt drive clips; and
    a plurality of belt hold-down clips;
    wherein said conveyor belt includes opposing first and second outer edges and said plurality of belt drive clips and/or belt hold-down clips are disposed on at least one of the first and second outer edges of the conveyor belt such that said belt drive clips and belt hold-down clips improve the edge drive capability of said conveyor belt; and
    wherein a plurality of said rows comprise a U-shaped link on each edge and a mesh overlay extending therebetween, the U-shaped links on each edge being aligned over the support rails of the spiral conveyor.

2. The conveyor belt according to claim 1, wherein each of said plurality of belt hold-down clips includes a base member having at least one opening and an extending member disposed substantially perpendicular to said base member, each of said plurality of belt hold-down clips further including opposing wing portions extending from opposing sides of said base member.

3. The conveyor belt according to claim 1, wherein each of said plurality of belt drive clips is generally J-shaped with a first leg portion, a second leg portion, and a connecting portion, the first and second leg portions defining two substantially parallel planes and the connecting portion defining a plane intersecting the two substantially parallel planes, each of said plurality of belt clips having at least one opening in the first leg portion or the second leg portion and no openings in the connecting portion, the openings of each belt drive clip existing entirely in the planes of the first and second leg portions.

4. The conveyor belt according to claim 3, wherein the first leg portion has two openings, the second leg portion has one opening, and the connecting portion connects the first and second leg portions.

5. A conveyor belt comprising:
    a plurality of spaced tractive rods;
    a plurality of rows transversely disposed with respect to a direction of travel and interconnecting said plurality of spaced tractive rods; and
    a plurality of belt drive clips;
    wherein a plurality of said rows comprise a welded U-shaped link on each edge and a mesh overlay extending therebetween;
    wherein at least some of the U-shaped links include an integral hold-down clip having a depending extension and an inwardly extending tab member, and at least some of the U-shaped links do not include the integral hold-down clip; and
    wherein said conveyor belt includes opposing first and second outer edges and said plurality of belt drive clips and/or U-shaped links with the integral hold-down clip are disposed on at least one of the first and second outer edges of the conveyor belt.

6. The conveyor belt according to claim 5, wherein the integral hold-down clip includes a depending extension and an extending tab member.

7. The conveyor belt according to claim 5, wherein said at least some of the U-shaped links including the integral hold-down clip includes every third one of said plurality of rows.

8. A conveyor belt with improved edge drive capability, said conveyor belt comprising:
    a plurality of spaced tractive rods;
    a plurality of pitch rows transversely disposed with respect to a direction of travel and interconnecting said plurality of spaced tractive rods; and
    a plurality of belt drive clips;
    wherein each of said rows comprises a welded U-shaped link on each edge and a mesh overlay extending therebetween, the U-shaped links including an inner leg and an outer leg relative to each edge, and a connecting member therebetween;
    wherein at least some of the U-shaped links include an edge guard on the inner leg;
    wherein at least some of the U-shaped links include an integral hold-down clip on the outer leg; and
    wherein said conveyor belt includes opposing first and second outer edges and said plurality of belt drive clips and/or U-shaped links with the edge guard are disposed on at least one of the first and second outer edges of the conveyor belt.

* * * * *

UNITED STATES PATENT AND TRADEMARK OFFICE
CERTIFICATE OF CORRECTION

PATENT NO. : 10,577,183 B2
APPLICATION NO. : 15/702200
DATED : March 3, 2020
INVENTOR(S) : Thomas O. Perdue et al.

Page 1 of 1

It is certified that error appears in the above-identified patent and that said Letters Patent is hereby corrected as shown below:

In the Specification

Column 4, Lines 25-26, "The upstanding extending" should be --The extending--.

Signed and Sealed this
Nineteenth Day of May, 2020

Andrei Iancu
*Director of the United States Patent and Trademark Office*